US009380284B2

(12) United States Patent
Inoue et al.

(10) Patent No.: US 9,380,284 B2
(45) Date of Patent: Jun. 28, 2016

(54) IMAGE PROCESSING METHOD, IMAGE PROCESSING DEVICE AND RECORDING MEDIUM

(75) Inventors: Akira Inoue, Tokyo (JP); Shinichi Uehara, Kanagawa (JP); Kenichi Takatori, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 255 days.

(21) Appl. No.: 12/921,057

(22) PCT Filed: Mar. 27, 2009

(86) PCT No.: PCT/JP2009/056337

§ 371 (c)(1),
(2), (4) Date: Sep. 3, 2010

(87) PCT Pub. No.: WO2009/123067

PCT Pub. Date: Oct. 8, 2009

(65) Prior Publication Data

US 2011/0012899 A1 Jan. 20, 2011

(30) Foreign Application Priority Data

Apr. 3, 2008 (JP) ........................ 2008-096773 2008

(51) Int. Cl.
*G06T 15/00* (2011.01)
*H04N 13/00* (2006.01)
(Continued)

(52) U.S. Cl.
CPC ............ *H04N 13/0003* (2013.01); *G06T 5/009* (2013.01); *G09G 3/003* (2013.01); *G09G 3/3611* (2013.01); *H04N 13/0018* (2013.01);
(Continued)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS 4,863,258 A 9/1989 Greene
8,106,865 B2 * 1/2012 Yoshida et al. ................. 345/89
(Continued)

FOREIGN PATENT DOCUMENTS

EP 2 259 601 A1 12/2010
JP 7193840 A 7/1995
(Continued)

OTHER PUBLICATIONS

International Search Report for PCT/JP2009/056337 mailed Jul. 7; 2009.
(Continued)

*Primary Examiner* — Xiao Wu
*Assistant Examiner* — Mohamma H Akhavannik
(74) *Attorney, Agent, or Firm* — Sughrue Mion, PLLC

(57) ABSTRACT

An image processing method, an image processing device and a program which can improve sharpness are provided. An image processing device 100 includes a right eye image processing unit 101 that outputs a right eye image displayed to a right eye, a left eye image processing unit 102 that outputs a left eye image displayed to a left eye, and a multi-eye image disparity unit that displays a right eye image and a left eye image to different viewpoint positions. The right eye image processing unit 101 and/or the left eye image processing unit 102 perform correction processing to an input image, and fluctuate at least one of amounts of correction of the right eye image and the left eye image with time.

8 Claims, 11 Drawing Sheets

(51) Int. Cl.

| | |
|---|---|
| ***G06T 5/00*** | (2006.01) |
| ***G09G 3/00*** | (2006.01) |
| ***G09G 3/36*** | (2006.01) |

(52) U.S. Cl.
CPC ....... *H04N13/0025* (2013.01); *H04N 13/0037* (2013.01); *G06T 2207/10021* (2013.01); *G06T 2207/10024* (2013.01); *G09G 2320/0247* (2013.01); *G09G 2320/066* (2013.01); *G09G 2320/0666* (2013.01); *G09G 2320/0673* (2013.01); *H04N 2213/006* (2013.01)

(56) References Cited

U.S. PATENT DOCUMENTS

| | | | | |
|---|---|---|---|---|
| 2004/0125447 | A1* | 7/2004 | Sato et al. | 359/462 |
| 2004/0145655 | A1* | 7/2004 | Tomita | 348/51 |
| 2005/0196040 | A1* | 9/2005 | Ohara | 382/167 |
| 2006/0008145 | A1* | 1/2006 | Kaku | 382/173 |
| 2006/0133687 | A1* | 6/2006 | Ehrlich et al. | 382/254 |
| 2007/0247477 | A1* | 10/2007 | Lowry et al. | 345/629 |
| 2008/0008382 | A1* | 1/2008 | Matsushima | 382/167 |
| 2008/0037863 | A1* | 2/2008 | Tooyama et al. | 382/154 |
| 2008/0180373 | A1* | 7/2008 | Mori | 345/89 |
| 2009/0195641 | A1* | 8/2009 | Neuman | 348/47 |

FOREIGN PATENT DOCUMENTS

| | | | | |
|---|---|---|---|---|
| JP | 8107569 | A | | 4/1996 |
| JP | 8321992 | A | | 12/1996 |
| JP | 10-224822 | A | | 8/1998 |
| JP | 11-511316 | A | | 9/1999 |
| JP | 2001251628 | A | | 9/2001 |
| JP | 2002300525 | A | | 10/2002 |
| JP | 2004032726 | A | | 1/2004 |
| JP | 2004229881 | A | | 8/2004 |
| JP | 2004279783 | A | | 10/2004 |
| JP | 2 0- 26800 | | | 1/2005 |
| WO | WO 2007/020760 | A1 | * | 2/2007 |

OTHER PUBLICATIONS

T. Oyama et al., "Sensory and Perceptual Psychology handbook", Seishin shobou, Jan. 20, 1994, pp. 552-555.

M. Takagi. et al., "Handbook of Image Analysis [Revised Edition]", University of Tokyo Press, Sep. 10, 2004, pp. 1187-1196.

Office Action dated Oct. 1, 2013 issued by the Japanese Patent Office in counterpart Japanese Application No. 2010505854.

The Extended European Search Report for EP 09 72 6901.3 dated on Mar. 4, 2013.

* cited by examiner

IMAGE PROCESSING METHOD, IMAGE PROCESSING DEVICE AND RECORDING MEDIUM

This application is the National Phase of PCT/JP2009/056337, filed Mar. 27, 2009, which is abase upon and claims the benefit of priority from Japanese patent application No. 2008-096773, filed on Apr. 3, 2008, the disclosure of which is incorporated herein in its entirety by reference.

TECHNICAL FIELD

The present invention relates to an image processing method, an image processing device, and a program which improve a display quality in a system that displays different images to a plurality of viewpoints.

BACKGROUND ART

Previously, Patent Document 1, Patent Document 2, and Patent Document 3 disclose a technique of generating and displaying images in which luminance components corresponding to left and right eyes are differ from each other. In Patent Document 1, by setting the luminance of one of left and right images to be relatively higher, and in Patent Documents 2 and 3, by enhancing a contrast of one of the images, a three-dimensional appearance and luster are achieved.

FIG. 11 is a view showing an example of an image processing device of a related art. An image processing device 300 of the related art is composed of a both eye images display unit 301, a right image luminance correcting unit 302, and a left image luminance correcting unit 303. The both eye images display unit 301 includes a right image display unit 304 and a left image display unit 305. An input image signal is input to each of the right image luminance correcting unit 302 and the left image luminance correcting unit 303. The right image luminance correcting unit 302 enhances a light-dark contrast after extracting a luminance Y from the image signal.

As an example of a contrast enhancement method, there is a method that applies a first tone curve 51 shown in FIG. 12 to the luminance Y. The left image luminance correcting unit 303 corrects the luminance by using a parameter which is different from that of the right image. As an example of the left image luminance correcting unit 303, there is a method that apples a second tone curve 52 to the luminance Y. The second tone curve 52 has a slope less than that of the first tone curve 51, and has a characteristic that a contrast enhancement effect is low.

The both eye images display unit 301 is a display device which is capable of presenting different images to right and left eyes of a human, and is utilized as a three-dimension display. As an example of the both eye images display unit 301, there is one in which a left and right image projection units are mounted with different polarization filters and an observer observes with both eyes through polarization glasses.

[Patent Document 1]
Japanese Unexamined Patent Application Publication No. 10-224822
[Patent Document 2]
Japanese Unexamined Patent Application Publication No. 2004-229881
[Patent Document 3]
Japanese Unexamined Patent Application Publication No. 11-511316

DISCLOSURE OF INVENTION

Technical Problem

However, in the related art, a temporal variation is not utilized, so there is a problem that texture such as luster of an object viewed under reflected light and metallic texture cannot be enhanced.

The present invention has been made to solve the above-mentioned problems, and it is an object of the invention to provide an image display device, an image display method, and a program which improve an image quality by displaying different images to both eyes.

Technical Solution

To solve the above problem, an image processing method according to an exemplary aspect of the invention includes the steps of inputting an input image, and performing a correction processing to a right eye image displayed to a right eye and a left eye image displayed to a left eye from the input image to output the processed images, in which in the step of the image correction, at least one of amounts of correction of the right eye image and the left eye image is fluctuated with time.

An image processing device according to another exemplary aspect of the invention includes a right eye image output means that outputs a right eye image displayed to a right eye; and a left eye image output means that outputs a left eye image displayed to a left eye, in which the right eye image output means and/or the left eye image output means perform correction processing to an input image, and fluctuate at least one of amounts of correction of the right eye image and the left eye image with time.

Advantageous Effects

According to the present invention, an image processing method, an image processing device and, a program which can improve sharpness can be provided.

EXPLANATION OF REFERENCE

1 MULTI-VIEW IMAGE DISPLAY UNIT
2, 86 ATTENTION AREA SPECIFIED UNIT
3, 83 RIGHT EYE IMAGE CORRECTION UNIT
4, 84 LEFT EYE IMAGE CORRECTION UNIT
5 RIGHT EYE AMOUNT OF CORRECTION TIME SERIES VARIATION UNIT
6 LEFT EYE AMOUNT OF CORRECTION TIME SERIES VARIATION UNIT
7, 87 RIGHT EYE IMAGE DISPLAY UNIT
8, 88 LEFT EYE IMAGE DISPLAY UNIT
9, 89 DISPARITY GENERATION UNIT
11, 85 IMAGE CORRECTION UNIT
12 LUMINANCE SEPARATOR
14, 24, 34 RGB CONVERTER
21 IMAGE CORRECTION UNIT
22 LUMINANCE SEPARATOR
24 CONVERTER
31 IMAGE CORRECTION UNIT
32 HSI CONVERTER
33 CHROMA CORRECTION UNIT
42 LIQUID CRYSTAL PANEL
43 RIGHT EYE IMAGE BUFFER
44 LEFT EYE IMAGE BUFFER
45 MULTI-VIEW IMAGE DISPLAY UNIT
100, 110, 120, IMAGE PROCESSING DEVICE
101 RIGHT EYE IMAGE PROCESSING UNIT
102 LEFT EYE IMAGE PROCESSING UNIT
103 MULTI-VIEW IMAGE DISPLAY UNIT

BEST MODE FOR CARRYING OUT THE INVENTION

First Exemplary Embodiment

Figure 1:
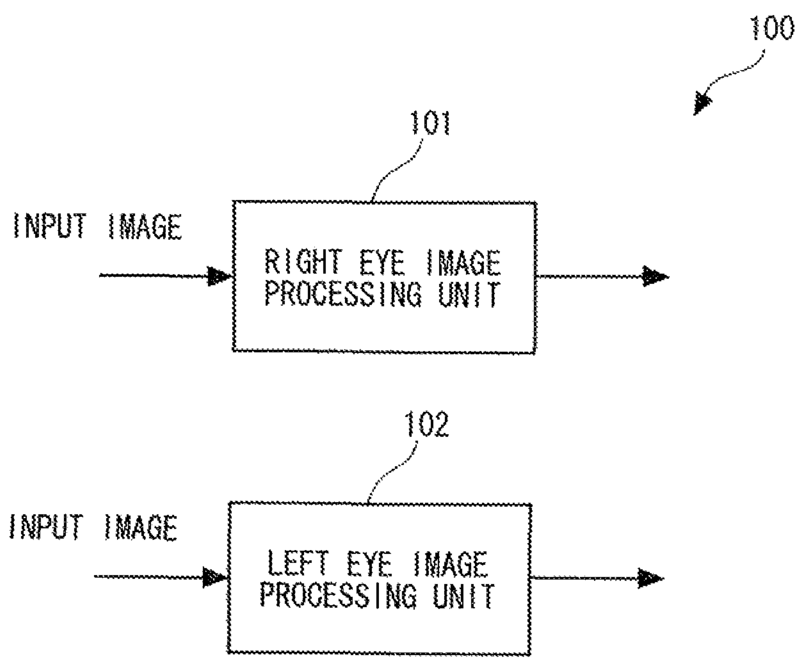
FIG. 1 is a view showing an image processing device of a first exemplary embodiment of the present invention.

Hereinafter exemplary embodiments of the present invention will be explained in detail with reference to the drawings. FIG. 1 is a view showing an image processing device 100 of a first exemplary embodiment of the present invention. The image processing device 100 includes a right eye image processing unit 101 which outputs a right eye image displayed to a right eye (first viewpoint) and a left eye image processing unit 102 which outputs a left eye image displayed to a left eye (second viewpoint). The right eye image processing unit 101, or the right eye image processing unit 101 and left eye image processing unit 102 perform contrast correction, lightness correction or chroma correction to an input image, and fluctuate amounts of correction of the right eye image and the left eye image with time. The input image is a video image.

In the present exemplary embodiment, a binocular rivalry is generated intentionally by fluctuating an image of one eye temporally, and then it is possible to reproduce texture such as luster of an object. Here, the right eye image processing unit 101 and the left eye image processing unit 102 may generate N images which are corrected by different correction processing from the same input image, and the multi-eye image display unit 103 may extract and display a right eye image displayed to a right eye and a left eye image displayed to a left eye by a predetermined rule from the N images.

Further, correction processing may be performed to only an attention area specified in an input image. Since an area which produces a binocular rivalry can be limited by specifying the attention area, it is possible to focus an attention of a viewer to the specified area. Furthermore, a disparity in a horizontal direction may be added to one input image. By this, it is possible to get a disparity image (three-dimensional image) with improved image quality.

Second Exemplary Embodiment

Next, a second exemplary embodiment will be explained. At first, in an image processing device of the present exemplary embodiment, a principle of changing texture and improving an image quality will be explained. According to a document edited by Ooyama, Imai, Waki, titled "Sensory and Perceptual Psychology handbook", Seishin shobou, pp. 552-555 (Non-patent document 1), when different images are shown alternately in the range of 2 Hz to 50 Hz, human-beings feel flicker. Normally, since this flicker makes a person feel discomfort, a treatment which suppresses the peak of this frequency band is performed. However, in order to express a shining looking of objects such as shimmer of water surface, metallic luster, metallic material feeling, and astronomical scintillation, it is required to show frames which are changed temporally.

According to the Non-patent document 1, even though it is changed depending on the cycle of presenting pattern or circumstance, there is a limitation point (perceptible limit) which human-beings feel flicker of time series image. Specifically, when the average of luminance values is B and an amount of change is $\Delta B$, a threshold modulation degree G is represented as $G=\Delta B/B$; however, it is pointed out that the threshold modulation degree G of around 0.1 is a limit which human-beings can perceive the flicker. Now, assume that input signal has eight bits (maximum luminance value is 255). In this case, if there is a luminance difference of about two between frames, a person may feel flicker. Actually, even if the luminance difference is one, a person may feel flicker. However if G goes down to around 0.001, flicker can be hardly felt.

If this temporally changing frame is displayed in a conventional monovision display, it may cause degradation of image quality because of the occurrence of flicker. However, both images are combined and perceived flicker is relieved by performing processing to one image by the multi-view display system. In this way, texture such as brightness of objects and luster can be evoke in one's brain by displaying N frames images while changing them. Further, by producing disparity with both eyes, in also stereovision, the above effect of image quality improvement can be given.

Figure 2:
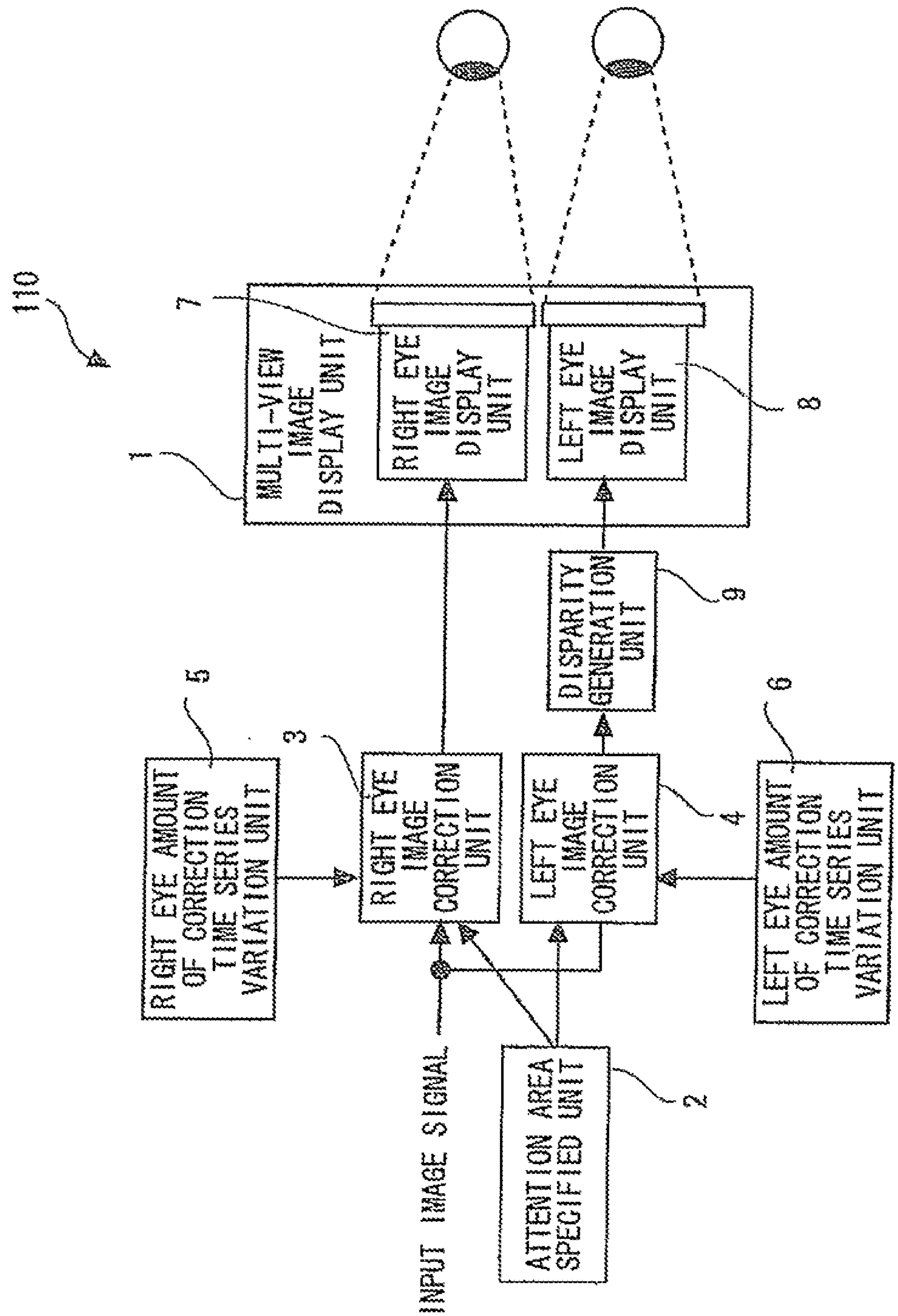
FIG. 2 is a block diagram showing an image processing device of a second exemplary embodiment of the present invention.

Next, the present exemplary embodiment will be explained in detail with reference to drawings. FIG. 2 is a block diagram showing an image processing device of the second exemplary embodiment of the present invention. As shown in FIG. 2, an image processing device 110 of the second exemplary embodiment includes a multi-view image display unit 1, an attention area specified unit 2, a right eye image correction unit 3, a left eye image correction unit 4, a right eye amount of correction time series variation unit 5, a left eye amount of correction time series variation unit 6, and a disparity generation unit 9. The multi-view image display unit 1 includes a right eye image display unit 7 and a left eye image display unit 8. The right eye correction unit 3 and the right eye amount of correction time series variation unit 5 constitute a right eye image processing unit. The left eye image correction unit 4 and the left eye amount of correction time series variation unit 6 constitutes a left eye image processing unit.

An input image signal is input to each of the right eye image correction unit 3 and the left eye image correction unit 4. The right eye image correction unit 3 and the left eye image correction unit 4 are blocks which perform a color gradation correction such as a contrast correction and tone curve correction to input image frames.

Figure 3:
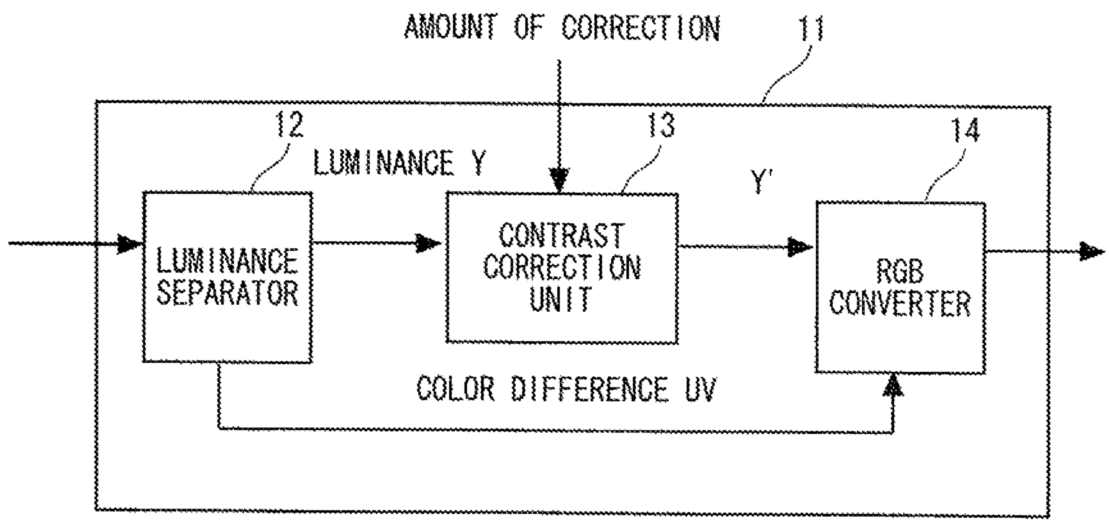
FIG. 3 is a view showing an image correction unit, as an example of a right eye image correction unit and a left eye image correction unit 4.
Figure 4:
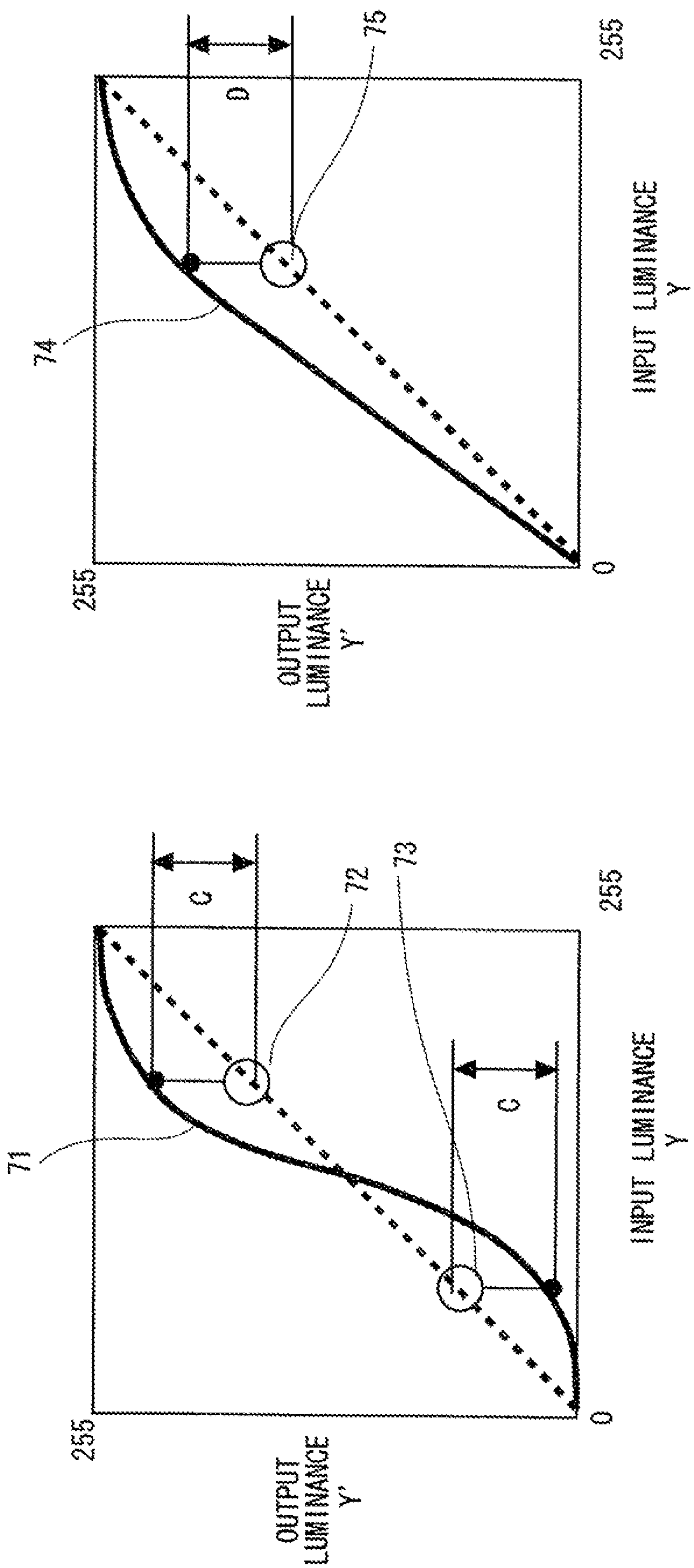
FIG. 4 is a view showing a contrast correction tone curve and a lightness correction tone curve.

One example of the right eye image correction unit 3 and the left eye image correction unit 4 includes an image correction unit 11 shown in FIG. 3. The image correction unit 11 is a block which performs a contrast correction to a luminance signal. An input RGB signal is separated into luminance Y and color difference UV by a luminance separator 12. The contrast correction unit performs a contrast correction to only luminance Y. One example of the contrast correction method includes a tone curve correction using a contrast correction tone curve 71 shown in FIG. 4. The contrast correction tone curve 71 can control a contrast correction intensity by combining an amount of correction C into a highlight control point 72 and a shadow control point 73. A luminance signal Y' after contrast correction is converted to RGB by being combined with the color difference UV again by the RGB converter 14.

Figure 5:
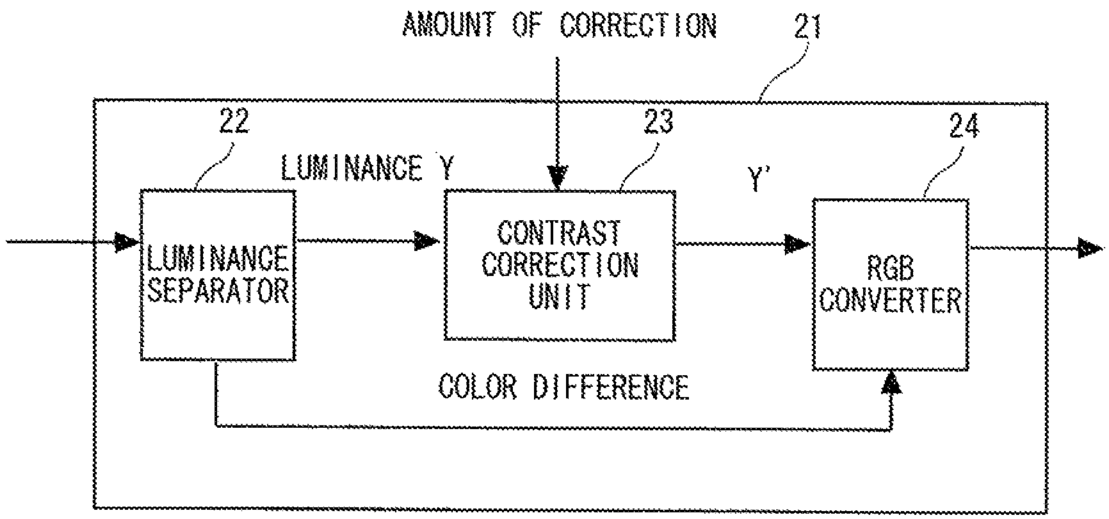
FIG. 5 is a view showing an image correction unit, as another example of a right eye image correction unit and a left eye image correction unit 4.

Another example of the right eye image correction unit 3 and the left eye image correction unit 4 include an image correction unit 21 shown in FIG. 5. The image correction unit 21 is a block which performs brightness correction to the luminance signal. An input RGB signal is separated into luminance Y and color difference UV by a luminance separator 22. A brightness correction unit performs a tone curve correction which changes tone of the whole image with respect to the luminance Y. One example of a brightness correction method includes a tone curve correction using a brightness correction tone curve 74 of FIG. 4. The brightness correction tone curve 74 can control brightness whole image by combining an amount of correction D into a brightness control point 75. A luminance signal Y' after brightness correction is converted to RGB by being combined with the color difference UV again by the RGB converter 24.

Figure 6:
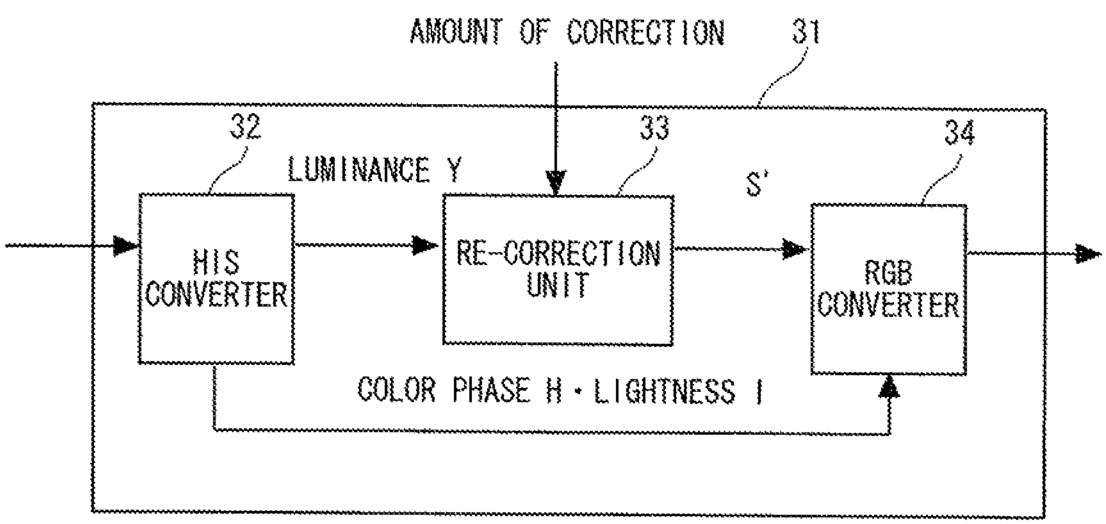
FIG. 6 is a view showing an image correction unit, as another example of a right eye image correction unit and a left eye image correction unit 4.

Another example of the right eye image correction unit 3 and the left eye image correction unit 4 includes an image correction unit 31 shown in FIG. 6. The image correction unit 31 is a block which performs a correction to a chroma signal of an image. An input RGB signal is separated into color phase H, lightness I, and chroma S by an HSI converter 32. One example of HSI conversion method includes a conversion method by six-sided pyramid model. The conversion method to an HSI coordinate system is known to public, and disclosed in a document edited by Takagi, Shimoda, titled "Image Analysis Handbook New Edition" University of Tokyo Press, pp. 1187-1196, 2004 (Non-patent document 2). Chroma S indicates saturation of color and a value indicating brilliance of color. A re-correction unit 33 performs enhancement or suppression processing to the chroma S. One example of the re-correction unit 33 includes an enhancement processing method using Expression (1). Expression (1) increases chroma S by an amount of correction m, and the whole image becomes bright with increasing m. A chroma signal S' after chroma correction is converted to RGB by being combined with the color phase H and the lightness I again by the RGB converter 34.

$$S' = m \times S \tag{1}$$

The right eye amount of correction time series variation unit 5 and left eye amount of correction time series variation unit 6 are blocks which output amounts of correction C, D, or m which change according to the predetermined rule. One example of operations of the right eye amount of correction time series variation unit 5 and the left eye amount of correction time series variation unit 6 is shown. N sets of amounts of correction set F(n) (n=1. . . N) are stored in the right eye amount of correction time series variation unit 5. N sets of amounts of correction G(n) (n=1. . . N) are stored in the left eye amount of correction time series variation unit 6. One example of a method of calculating right eye and left eye amount of correction at time t includes T1(t), T2(t) of Expression (2).

$$T1(t) = F((t)\,\%\,N) + 1)$$

$$T2(t) = G((t)\,\%\,N) + 1) \tag{2}$$

The sign % of Expression (2) represents remainder. In Expression (2), predetermined N amounts of correction are applied in series in accordance with time t. Further, when they are applied to a video, the amounts of correction can be switched in a unit of a plurality of frames. As an example, for example, if N=12, and F(n)={1,1,1,1,3,3,3,3,10,10,10,10}, the amount of correction can be switched to 1, 3, 10 for every four frames. Furthermore, an example in which one of left and right amounts of correction is fixed includes T1(t), T2(t) of Expression (3).

$$T1(t) = F(1)$$

$$T2(t) = F((t\,\%\,N) + 1) \tag{3}$$

Expression (3) shows that the amount of correction T1(t) of a right eye correction image is fixed, and the amount of correction T2(t) of a left eye correction image is switched in series from first to Nth. If N=2, in a side of the second amount of correction T2(t), images by two amounts of correction are switched in series. Although the amount of correction of the right eye correction image is fixed in Expression (3), the left eye T2 may be fixed and an image of the right eye T1 may be corrected. The right eye image correction unit 3 and the left eye image correction unit 4 perform correction processing by using amounts of correction C, D, or m which is generated by the right eye amount of correction time series variation unit 5 and the left eye amount of correction time series variation unit 6.

Next, the disparity generation unit 9 operates in response to an output of the left eye image correction unit 4. The disparity generation unit 9 adds disparity in the horizontal direction to only one image to perform stereovision. Specifically, the disparity generation unit 9 performs translating processing for each pixel in accordance with the depth of each pixel of an image. For example, an amount of movement of an object which is far away is set to zero. Then it is possible to make the object stand out in front by displaying an image which is obtained by moving region pixels of the object X which is near by d in a horizontal direction and a right eye image to the both eyes. Although the disparity generation unit 9 is arranged subsequent to the left eye image correction unit 4 in the present exemplary embodiment, the disparity generation unit 9 can be arranged subsequent to the right eye image correction unit 3. Further, if the stereovision is not conducted, the amount of disparity movement can be set to zero.

An output of the disparity generation unit 9 and an output of the right eye image correction unit 3 are input to the multi-view image display unit 1. The multi-view image display unit 1 is a display device which can show different images to different viewpoint positions and includes the right eye image display unit 7 which displays a right eye display image and the left eye image display unit 8 which displays a left eye display image. The multi-view image display unit 1 can display a right eye image and a left eye image corresponding to different viewpoints (each of a right eye and a left eye) respectively. Therefore the multi-view image display unit 1 is often utilized for a three-dimensional display. An example of the multi-view image display unit 1 includes a multi-view image display unit that includes different polarized filters in a right eye image display unit and a left eye image display unit, and allows viewers to perform binocular vision through polarized glasses.

Figure 7:
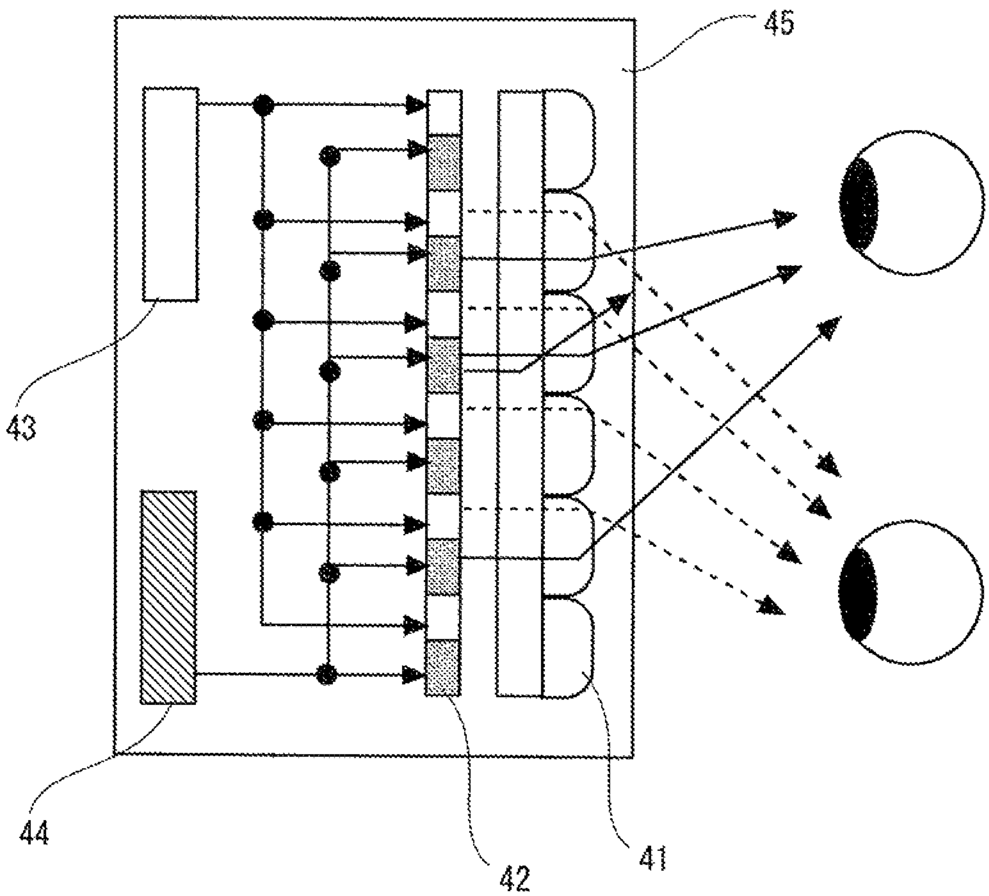
FIG. 7 is a view showing a multi-view image display unit using a lenticular lens.

Further, another example of the multi-view image display unit 1 includes a multi-view image display unit 45 which uses a lenticular lens shown in FIG. 7. The multi-view image display unit 45 includes lenticular lenses which are laterally arranged in front of a liquid crystal panel 42. Images which correspond to each viewpoint are accumulated in a right eye image buffer 43 and a left eye image buffer 44. In the liquid crystal panel 42, strips of a right eye image and strips of a left eye image are combined alternately and displayed in accordance with a size of the lenticular lens. Since a light path is bent by the lenticular lens, images which correspond to a right eye and a left eye of human and images which correspond to a plurality of viewpoints can be displayed. Note that, when an input image signal includes disparity information, the disparity generation unit 9 may be omitted.

FIG. 7 shows one example of a multi-view image display unit; but a multi-view image display unit is not limited to this example. For example, in an eyeglass system, there are an anaglyph system which uses color filters of different colors to left and right eyes, a system obtained by developing an anaglyph method and using three different areas to each of left and right eyes with dividing a wavelength area of visible light into six pieces, and a system which puts glasses corresponding to eyes into a transmission state with dividing each image which corresponds to left and right eyes in a time axis direction and with displaying the images in turn by using liquid-crystal shutter glasses (stereo shutter glasses). Further, for example, in a naked-eye method, there are a barrier system which limits a light which reaches each of left and right eyes by using a disparity barrier (parallax barrier), and a scan back light system which controls image entering the eye and a light direction with timesharing by displaying each image which is into each of left and right eyes with time-sharing on a display device, switching a way of inputting a light to right direction and left direction in the back light of the display device with time-sharing and using a lens as well.

Furthermore, another system includes a viewer system which displays image corresponding to each eye on each display device by near-eye system which puts display devices corresponding to each eye in front of eyes by forms such as a head mount display. The present exemplary embodiment can be preferably applied to these varieties of each system of multi-view display units. This is because the present exemplary embodiment is an image processing method, and images which are generated by this processing can recognize multi-view information by being converted in accordance with each variety of systems of multi-view image display units and being monitored through a multi-view image display unit.

Figure 8:
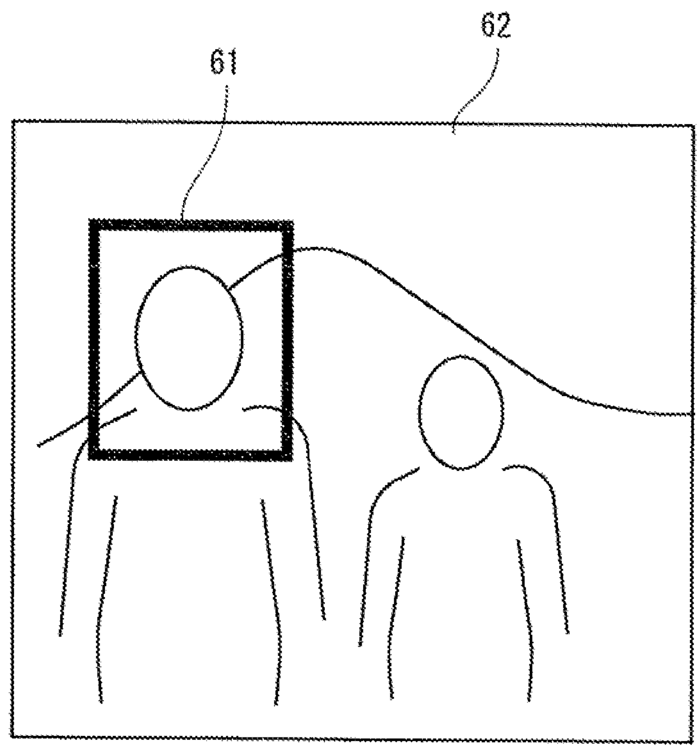
FIG. 8 is a view showing an example of an attention area.

The attention area specified unit 2 specifies a part of area which a viewer wants to pay attention to in an image. One example of an attention area is shown in FIG. 8. FIG. 8 shows a portrait image 62, and an area surrounded by a rectangle in the image is an attention area 61. In this case, a face area of the portrait of the front is specified. An attention area may include a product area in an advertisement image in addition to the face area of a portrait. An area definition method includes a method using an input device such as a mouse. Further, there is another method which detects an attention area from each image frame automatically by using an image-recognition technique.

Figure 9:
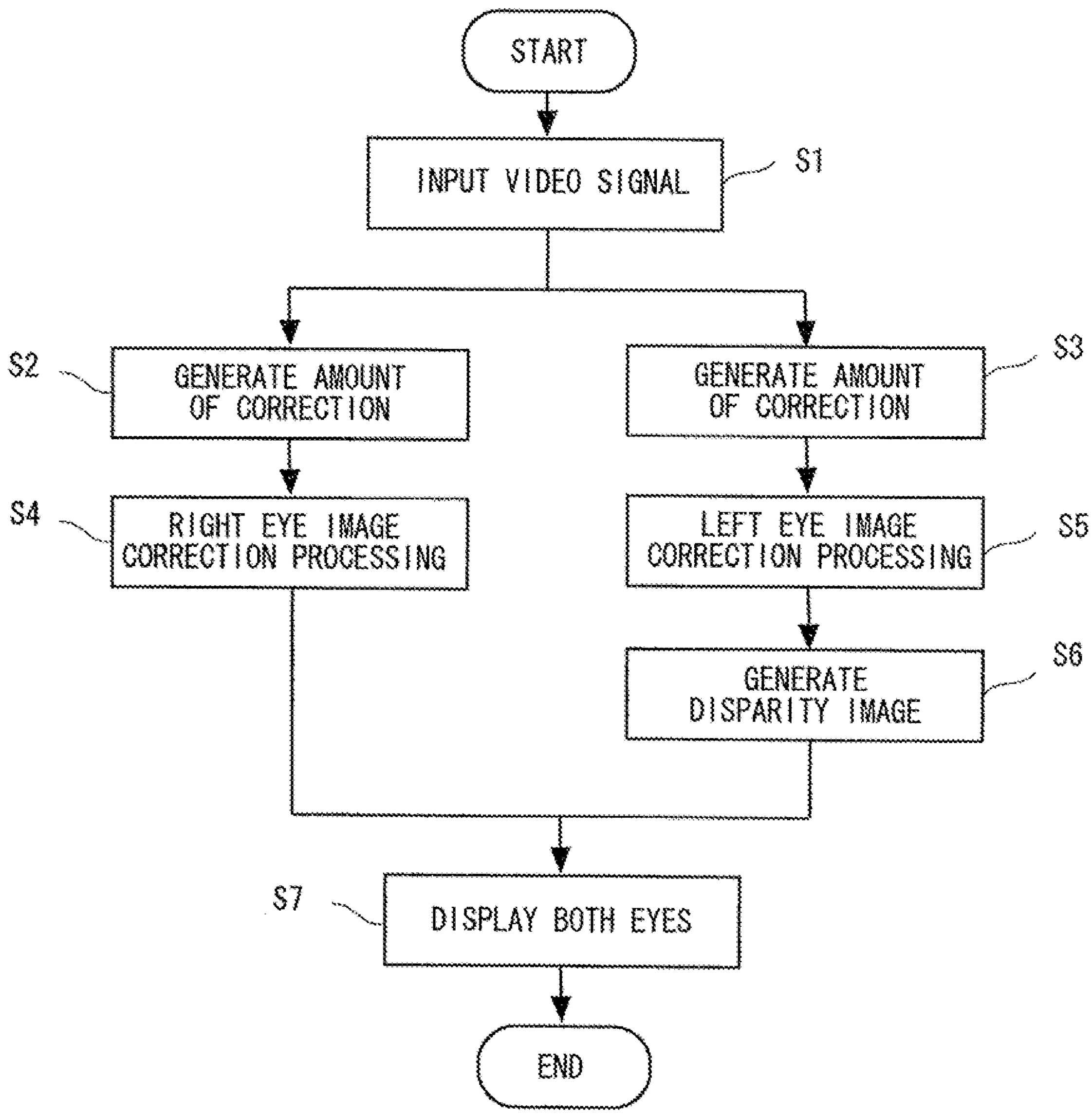
FIG. 9 is a flow chart showing an operation of the image processing device of the second exemplary embodiment of the present invention.

Next, an operation of the image processing device of the present exemplary embodiment will be explained. FIG. 9 is a flow chart showing an operation of the image processing device of the present exemplary embodiment. As shown in FIG. 9, at first, an image signal is input. Although a video is input in the present exemplary embodiment, a still image can be processed in the same way.

The image signal is input to the right eye image correction unit 3 and the left eye image correction unit 4 (step S1). The image signal which is input to the right eye image correction unit 3 is separated into a luminance signal and a color difference signal. Next, the right eye amount of correction time series variation unit 5 and the left eye amount of correction time series variation unit 6 generate an amount of correction which changes in accordance with the predetermined rule (steps S2, S3). The right eye image correction unit 3 corrects the luminance signal with the amount of correction which is generated by the right eye amount of correction time series variation unit 5, to generate a correction signal by converting the corrected luminance signal and the color difference signal into RGB (step S4). Also, in the left eye image correction unit 4, a correction signal is generated by using the amount of correction which is generated by the left eye amount of correction time series variation unit 6 from the input image signal (step S5).

Next, the signal corrected by the left eye amount of correction time series variation unit 6 is input to the disparity generation unit 9 and is changed to a predetermined disparity image (step S6). Then, a right eye image and a left eye image are displayed at the multi-view image display unit 1 (step S7).

In the present exemplary embodiment, it is possible to reproduce texture such as luster of an object by fluctuating an image of one eye temporally and producing a binocular rivalry intentionally. Further, since the area where a binocular rivalry is occurred can be limited by performing correction processing to only an attention area which is specified in an input image, an attention of a viewer can be focused to a specific area. Furthermore, a disparity image (three-dimensional image) of which image quality is improved can be obtained by adding a disparity in a horizontal direction to one input image.

Third Exemplary Embodiment

Figure 10:
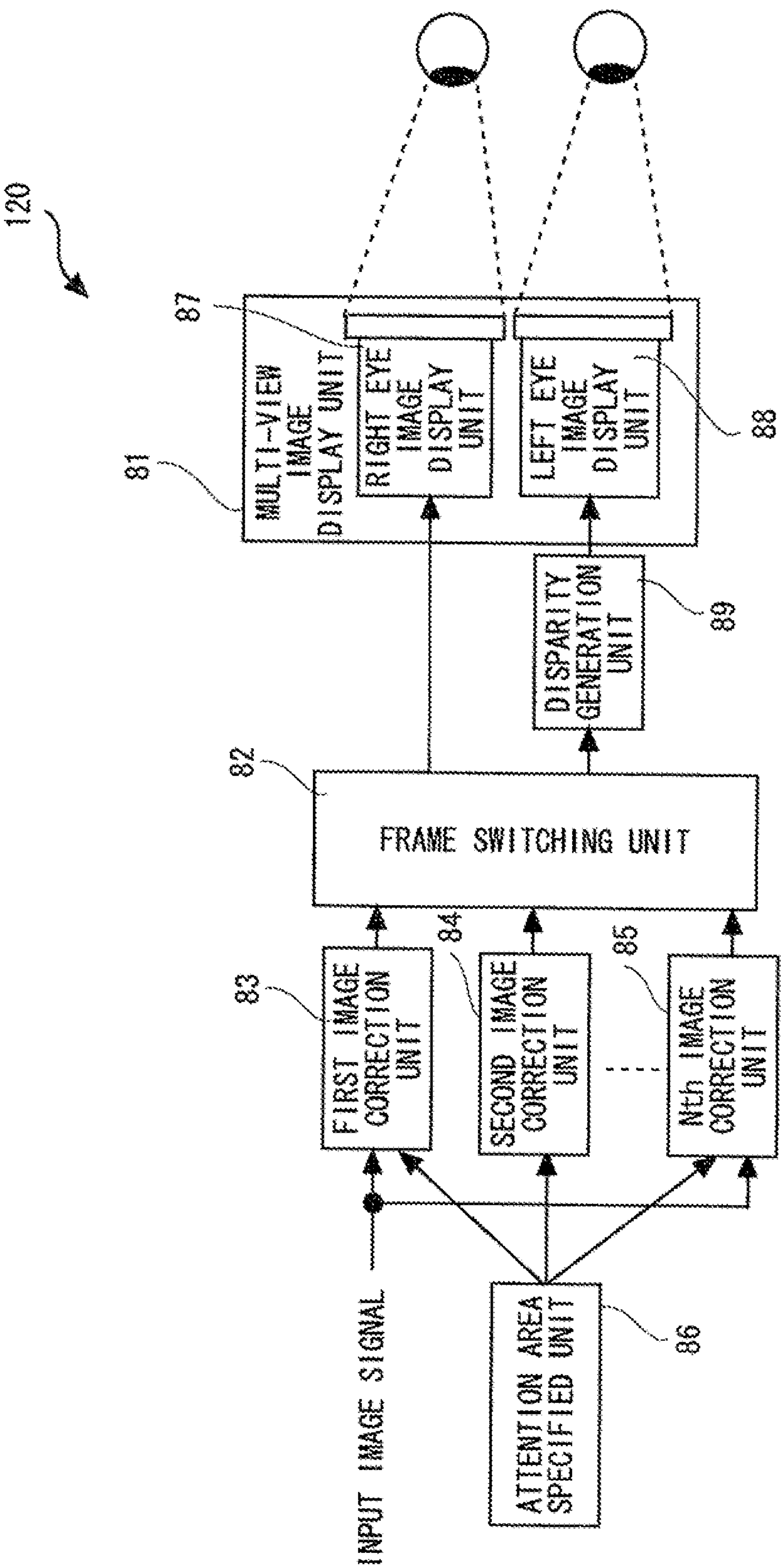
FIG. 10 is a block diagram showing an image processing device of a third exemplary embodiment of the present invention.
Figure 11:
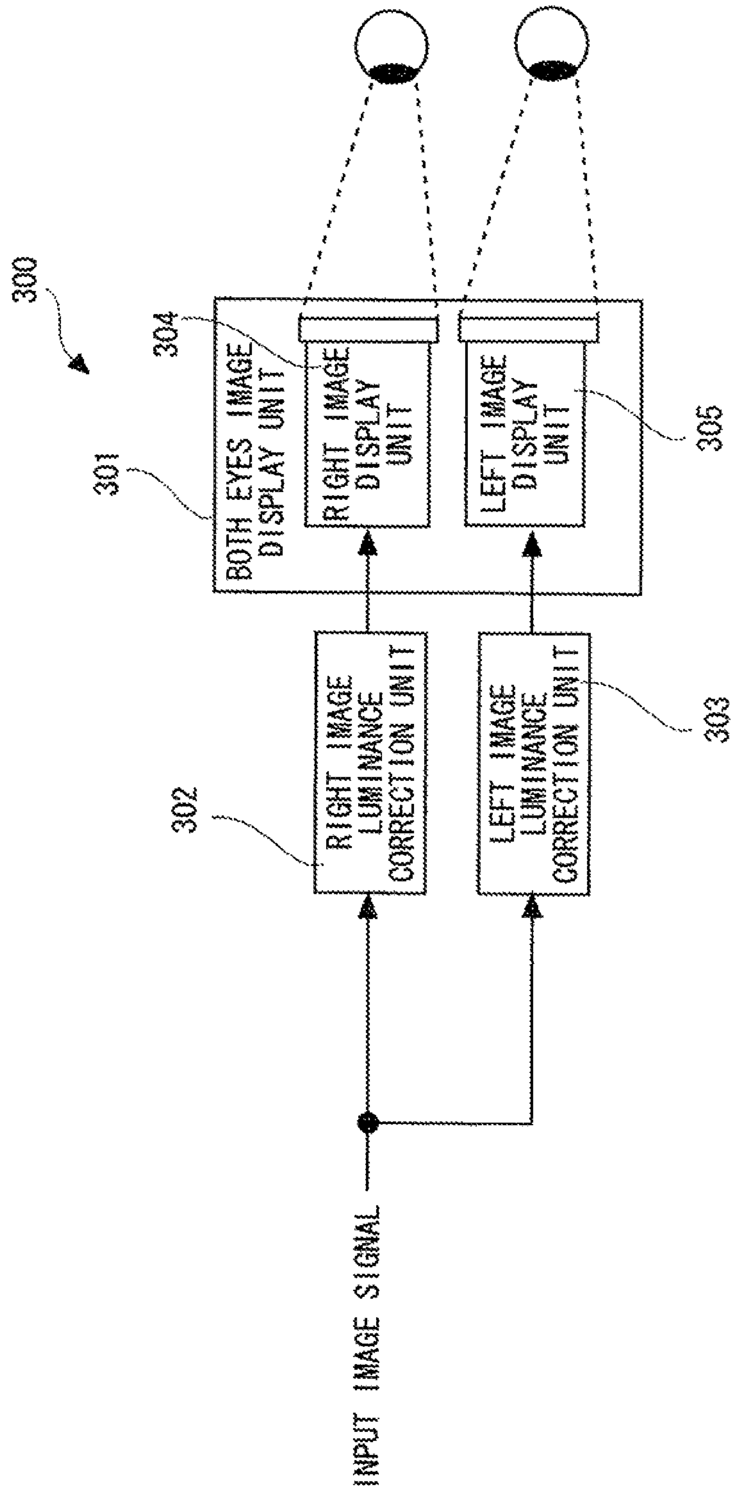
FIG. 11 is a view showing an example of an image processing device of a related art.
Figure 12:
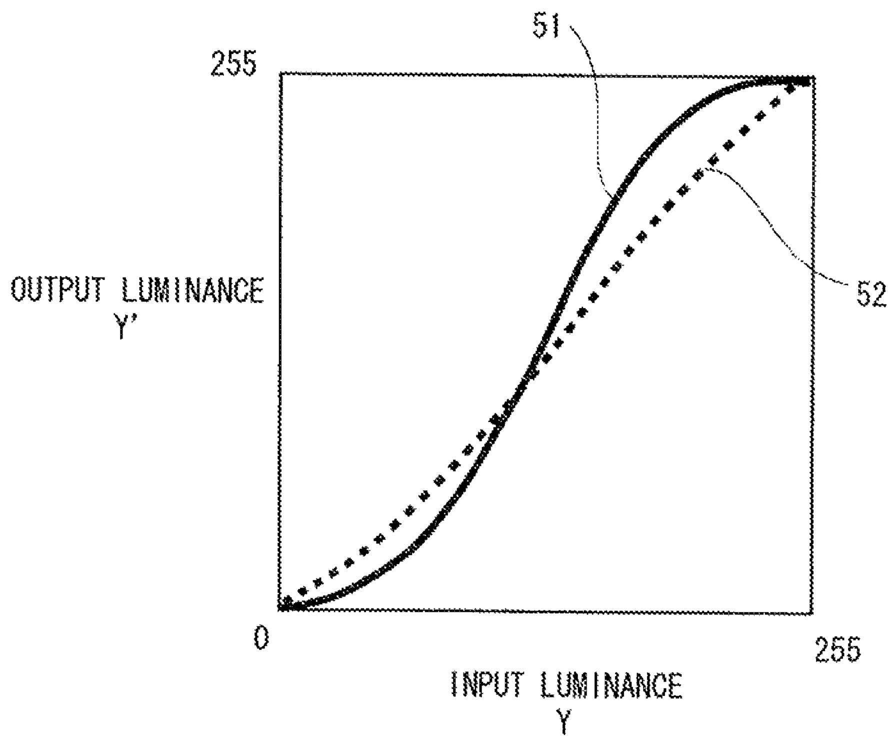
FIG. 12 is a view showing a first tone curve.

Next, a third exemplary embodiment of the present invention will be explained in detail with reference to the drawings. FIG. 10 is a block diagram showing an image processing device of the third exemplary embodiment of the present invention. As shown in FIG. 10, an image processing device 120 includes a multi-view image display unit 81, a frame switching unit 82, a first image correction unit 83, a second image correction unit 84, an Nth image correction unit 85, an attention area specified unit 86, and a disparity generation unit 89. The multi-view image display unit 81 includes a right eye image display unit 87 and a left eye image display unit 88.

An input image signal is input to each of N image correction units which include the first image correction unit 83, the second image correction unit 84, and the Nth image correction unit 85. The first image correction unit 83, the second image correction unit 84, and the Nth image correction unit 85 perform image correction processing to image frames. An example of the image correction unit includes the image correction unit 11 which performs a contrast correction shown in FIG. 3. Another example of the image correction unit includes the image correction unit 21 which performs a lightness correction shown in FIG. 5. Further example of the image correction unit includes the image correction unit 31 which performs a chroma correction shown in FIG. 6. Each operation is the same as that in the first exemplary embodiment.

The frame switching unit 82 is a block which extracts two image frames for a right eye image display and a left eye image display from output image frames of the N image correction units. Although it is assumed that correction processing is performed by N different amounts of correction in the N image correction unit, a part of N image correction units can use the same amount of correction for correction processing. The frame switching unit 82 outputs N image frames corresponding to N image correction units in accordance with the predetermined rule while switching them. An operation of the frame switching unit 82 will be explained. It is assumed that an output image of the nth image correction unit (n=1 . . . N) is I(n). An example of output image calculation of the frame switching unit 82 includes Ur(t), Ul(t) of Expression (4). Ur(t) represents a right eye display image, and Ul(t) represents a left eye display image.

$$Ur(t)=I(t,(t\ \%\ N)+1)$$

$$Ul(t)=I(t,(t\ \%\ N)+2) \quad (4)$$

The sign % of Expression (4) represents remainder. In Expression (4), two correction images are combined in numerical order from N correction images, and they are sorted into a right eye and left eye display images. Further, in a video image, the correction images may be switched by a unit of a plurality of frames, For example, if N=12, Ur(t)={I(1), I(1), I(3), I(3), I(10), I(10), I(12), I(12)}, a right eye image can be switched into the first, the third, the tenth, the twelfth correction images for every two frames. Further, an example of fixing one of right and left correction images include Ur(t), Ul(t) of Expression (5).

$$Ur(t)=I(t,1)$$

$$Ul(t)=I(t\ \%\ N)) \quad (5)$$

In Expression (5), a right eye display image is kept fixed, and only left eye display images are switched from one to N in series. Further, when N=2, right and left images may be switched regularly. Although a right eye display image is fixed in Expression (5) a left eye display image may be fixed instead.

Next, the disparity generation unit 89 operates in response to one of outputs of the frame switching unit 82. The disparity generation unit 89 adds a disparity in a horizontal direction to only one image to conduct stereovision, and performs the same operation as the disparity generation unit 9. Note that, when input image signal includes disparity information, the disparity generation unit 89 may be omitted.

An output of the disparity generation unit 9 and another output of the frame switching unit 82 are input to the multi-view image display unit 81. The multi-view image display unit 81 can display different images to a right eye and a left eye of human-beings, and includes the right eye image display unit 87 which displays an image for a right eye to a right eye and the left eye image display unit 88 which displays an image for a left eye to a left eye. The multi-view image display unit 81 performs the same operation as the multi-view image display unit of the first exemplary embodiment.

The attention area specified unit 86 is a block which specifies a part of area where a viewer wants to pay attention to from an image, and performs the same operation as the attention area specified unit 2. The specified attention area is input to the N image correction means, and the N image correction units perform image correction only to the attention area.

In the present exemplary embodiment, texture such as brightness of objects and luster can be evoked in one's brain by displaying N frames images while changing them. Further, by producing disparity with both eyes, an effect of image quality improvement can be given also in stereovision.

For example, the exemplary embodiments have been explained above as a hardware construction, but the present invention is not limited to this, and arbitrary processing can be achieved by causing a CPU (Central Processing. Unit) to execute a computer program. In this case, the computer program can be provided by recording it in a recording medium and also can be provided by transmitting it through the Internet or other transmission media. Further, the recording medium includes, for example, a flexible disc, a hard disc, a magnetic disc, a magneto optical disc, a CD-ROM, a DVD, a ROM cartridge, a RAM memory cartridge with battery backup, a flash memory cartridge, a nonvolatile RAM cartridge and so on. Furthermore, communication medium includes a wire communication medium such as a telephone line, and a wireless communication medium such as a micro wave line.

Although the present invention is explained with reference to the exemplary embodiments, the present invention is not limited to the above. The constructions and details of the present invention can be changed variously in scope of the invention which can be understood by one of ordinary skill in the art.

INDUSTRIAL APPLICABILITY

The present invention can be applied to an image processing method, an image processing device, and a program which can improve an image quality in a system which displays different images to difference viewpoint positions.

The invention claimed is:

1. An image processing method comprising:

performing a correction processing to at least one of a right eye image displayed to a right eye and a left eye image displayed to a left eye from a same input image to output the processed images for the right and left eyes, wherein, the input image is a video image comprising temporally changing frames, wherein, during the correction processing, with respect to only the right eye image or only the left eye image, an amount of correction for a specific value of luminance before correction is fluctuated with the temporally changing frames, the amount of correction is equal to a difference of one or two about a luminance value of the right eye image or the left eye image, when a maximum of the luminance value is 255 in a signal of the same input image because the same input image is an eight-bit signal, and during the correction processing, tone curve correction changing the input image with respect to the luminance is performed, the tone curve comprises a highlight control point and a shadow control point, a luminance of the highlight control point is higher than a luminance of the shadow control point, a correction at the highlight control point is additive, and a correction at the shadow control point is subtractive.

2. An image processing method comprising:

performing a correction processing to at least one of a right eye image displayed to a right eye and a left eye image displayed to a left eye from a same input image to output the processed images for the right and left eyes, wherein the input image is a video image comprising temporally changing frames, wherein, during the correction processing, with respect to only the right eye image or only the left eye image, an amount of correction for a specific value of luminance before correction is fluctuated with the temporally changing frames, a threshold modulation degree G is equal to or larger than 0.01, when the specific value of luminance before correction is B and the amount of correction is ΔB and the threshold modulation degree G is represented as G=ΔB/B, the amount of correction is equal to a difference of one or two about a luminance value of the right eye image or the left eye image, when a signal of the specific value of luminance is an eight-bit signal, and during the correction processing, tone curve correction changing the input image with respect to the luminance is performed, the tone curve comprises a highlight control point and a shadow control point, a luminance of the highlight control point is higher than a luminance of the shadow control point, a correction at the highlight control point is additive, and a correction at the shadow control point is subtractive.

3. The image processing method according to claim 2, wherein, during the correction processing, N images are generated from the same input image, the amount of correction being different from each other among the N images, only the right eye image or only the left eye image from the N images is extracted by using a predetermined rule.

4. The image processing method according to claim 2, wherein the correction process is performed only on an attention area which is specified in the input image.

5. The image processing method according to claim 2, wherein a disparity in a horizontal direction is added to one input image.

6. The image processing method according to claim 2, wherein, during the correction processing, tone curve correction changing lightness of a whole image with respect to the luminance is performed.

7. An image processing device comprising:

a right eye image display device that outputs a right eye image displayed to a right eye; and a left eye image display device that outputs a left eye image displayed to a left eye, wherein the right eye image display device and/or the left eye image display device perform correction processing to a same input image, wherein, the input image is a video image comprising temporally changing frames and fluctuate an amount of correction for a specific value of luminance before correction with respect to only the right eye image or only the left eye image with the temporally changing frames, a threshold modulation degree G is equal to or larger than 0.01, when the specific value of luminance before correction is B and the amount of correction is ΔB and the threshold modulation degree G is represented as G=ΔB/B, and the amount of correction is equal to a difference of one or two about a luminance value of the right eye image or the left eye image, when a signal of the specific value of luminance is an eight-bit signal, and during the correction processing, tone curve correction changing the input image with respect to the luminance is performed, the tone curve comprises a highlight control point and a shadow control point, a luminance of the highlight control point is higher than a luminance of the shadow control point, a correction at the highlight control point is additive, and a correction at the shadow control point is subtractive.

8. A non-transitory computer readable medium storing a program for causing a computer to execute a predetermined operation, the program comprising:

performing a correction processing to at least one of a right eye image displayed to a right eye and a left eye image displayed to a left eye from an input image to output the processed images, wherein, the input image is a video image comprising temporally changing frames, wherein, during the correction processing, with respect to only the right eye image or only the left eye image, an amount of correction for a specific value of luminance before correction is fluctuated with the temporally changing frames, and a threshold modulation degree G is equal to or larger than 0.01, when the specific value of luminance before correction is B and the amount of correction is ΔB and the threshold modulation degree G is represented as G=ΔB/B, the amount of correction is equal to a difference of one or two about a luminance value of the right eye image or the left eye image, when a signal of the specific value of luminance is an eight-bit signal, and during the correction processing, tone curve correction changing the input image with respect to the luminance is performed, the tone curve comprises a highlight control point and a shadow control point, a luminance of the highlight control point is higher than a luminance of the shadow control point, a correction at the highlight control point is additive, and a correction at the shadow control point is subtractive.

* * * * *